United States Patent

Kawai

[11] Patent Number: 5,917,261
[45] Date of Patent: Jun. 29, 1999

[54] MOTIVE POWER GENERATING APPARATUS UTILIZING ENERGY OF PERMANENT MAGNET

[75] Inventor: Teruo Kawai, Tokyo, Japan

[73] Assignee: Nihon Riken Co., Ltd., Tokyo, Japan

[21] Appl. No.: 09/159,547

[22] Filed: Sep. 24, 1998

[30] Foreign Application Priority Data

Sep. 25, 1997 [JP] Japan ................................ 9-260638

[51] Int. Cl.$^6$ .............................. H02K 1/27; H02K 1/14
[52] U.S. Cl. ...................... 310/114; 310/178; 310/156
[58] Field of Search .................................. 310/114, 178, 310/49 R, 156, 112, 268

[56] References Cited

U.S. PATENT DOCUMENTS

| 2,120,109 | 6/1938 | Merrill | 310/178 |
|---|---|---|---|
| 4,134,054 | 1/1979 | Akamatsu | 318/685 |
| 4,266,153 | 5/1981 | O'Mahony | 310/111 |
| 4,306,164 | 12/1981 | Itoh et al. | 310/49 R |
| 4,899,072 | 2/1990 | Ohta | 310/49 R |
| 5,436,518 | 7/1995 | Kawai | 310/156 |

*Primary Examiner*—Thomas M. Dougherty
*Assistant Examiner*—K. Imayoshi Tamai

*Attorney, Agent, or Firm*—Wenderoth, Lind & Ponack, L.L.P.

[57] ABSTRACT

A motive power generating apparatus utilizing magnetic flux from permanent magnets providing higher efficiency and torque is disclosed. An apparatus according to one embodiment of the present invention comprises a pair of disc-shaped rotors 10 and 20, a pair of ring-shaped stators 30 and 40, a rotational shaft 50, a permanent magnet 60, and a current controller 80. Each rotor 10, 20 is a disc-shaped member formed of magnetic material. Each stator 30, 40 further includes twelve electromagnets 32, 42 provided along the outer periphery of each disc-shaped rotor 10, 20 at intervals of thirty degrees. Each electromagnet 32, 42 has an armature 32a, 42a and a winding 32b, 42b. Each rotor 10, 20 contains six sets of protruding poles 10a, 20a disposed around the outer periphery thereof at intervals of sixty degrees. Each rotor 10, 20 is magnetized in opposite polarities by the permanent magnet 60 disposed therebetween. Since every other electromagnet 32, 42 corresponds to each of the protruding poles 10a, 20a of the rotor 10, 20, the adjacent electromagnets 32, 42 are energized in opposite polarities while the polarities are reversed by every thirty degree rotation of the rotors 10, 20 to continuously attract the adjacent incoming protruding poles 10a, 20a magnetically.

8 Claims, 6 Drawing Sheets

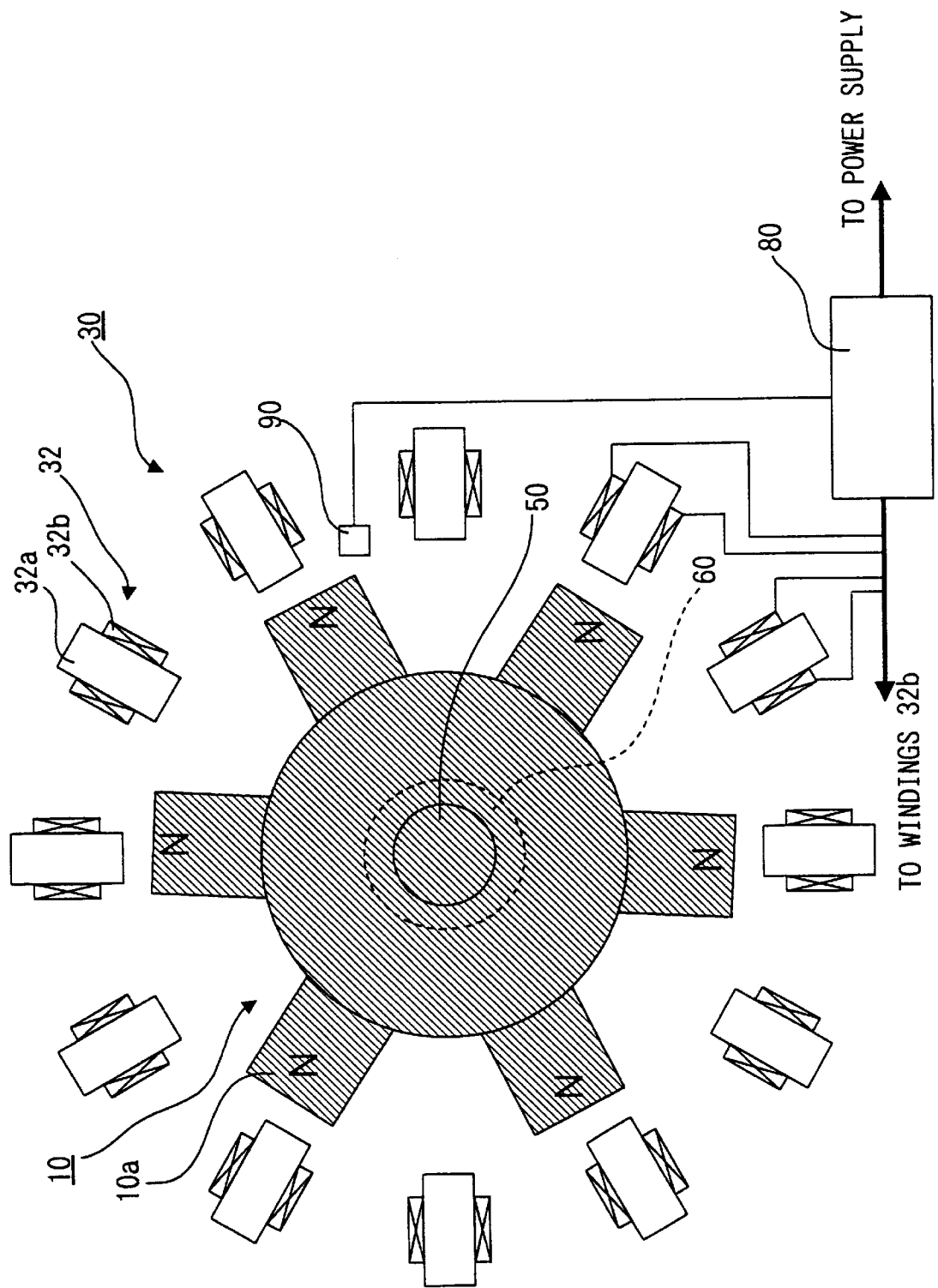

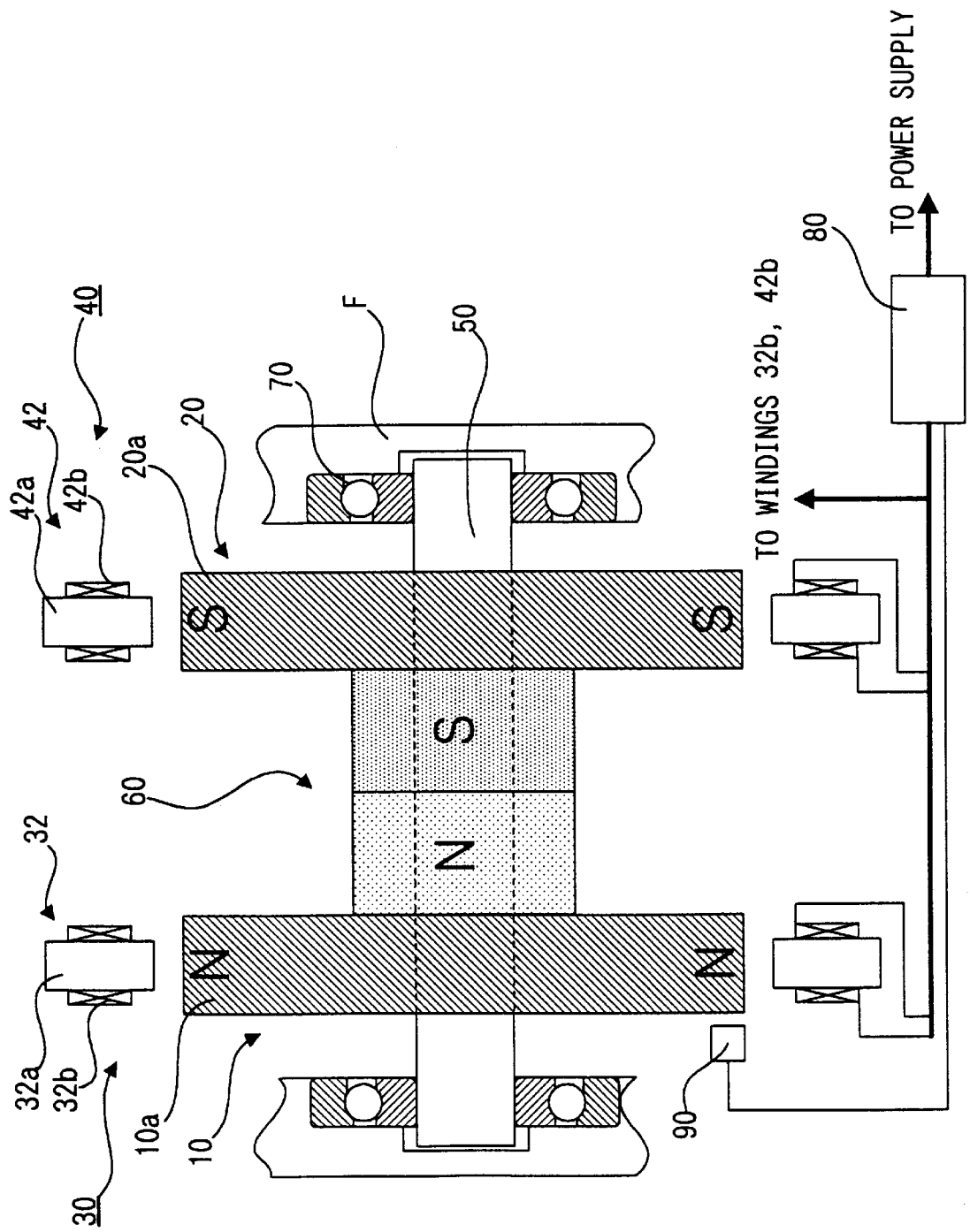

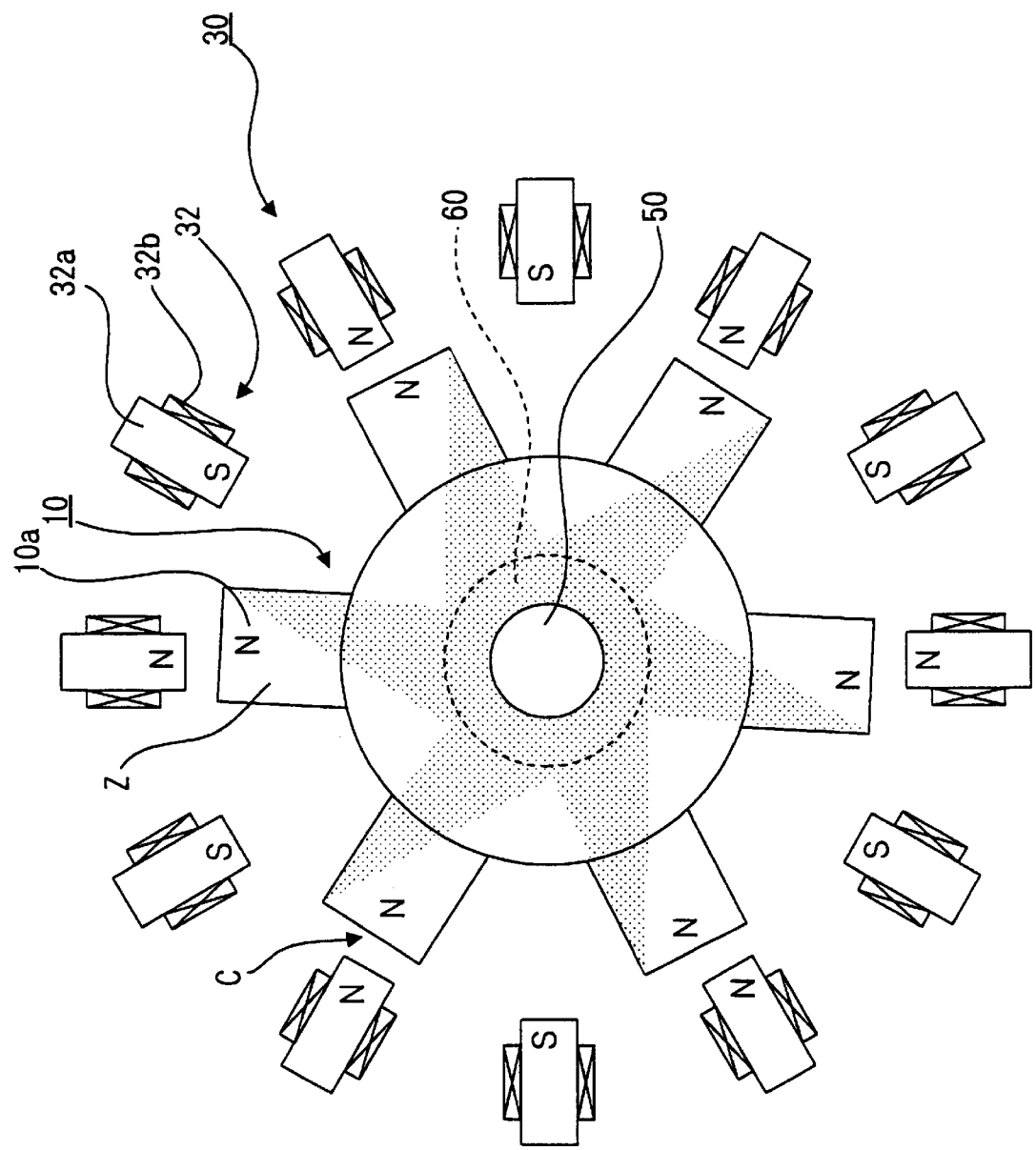

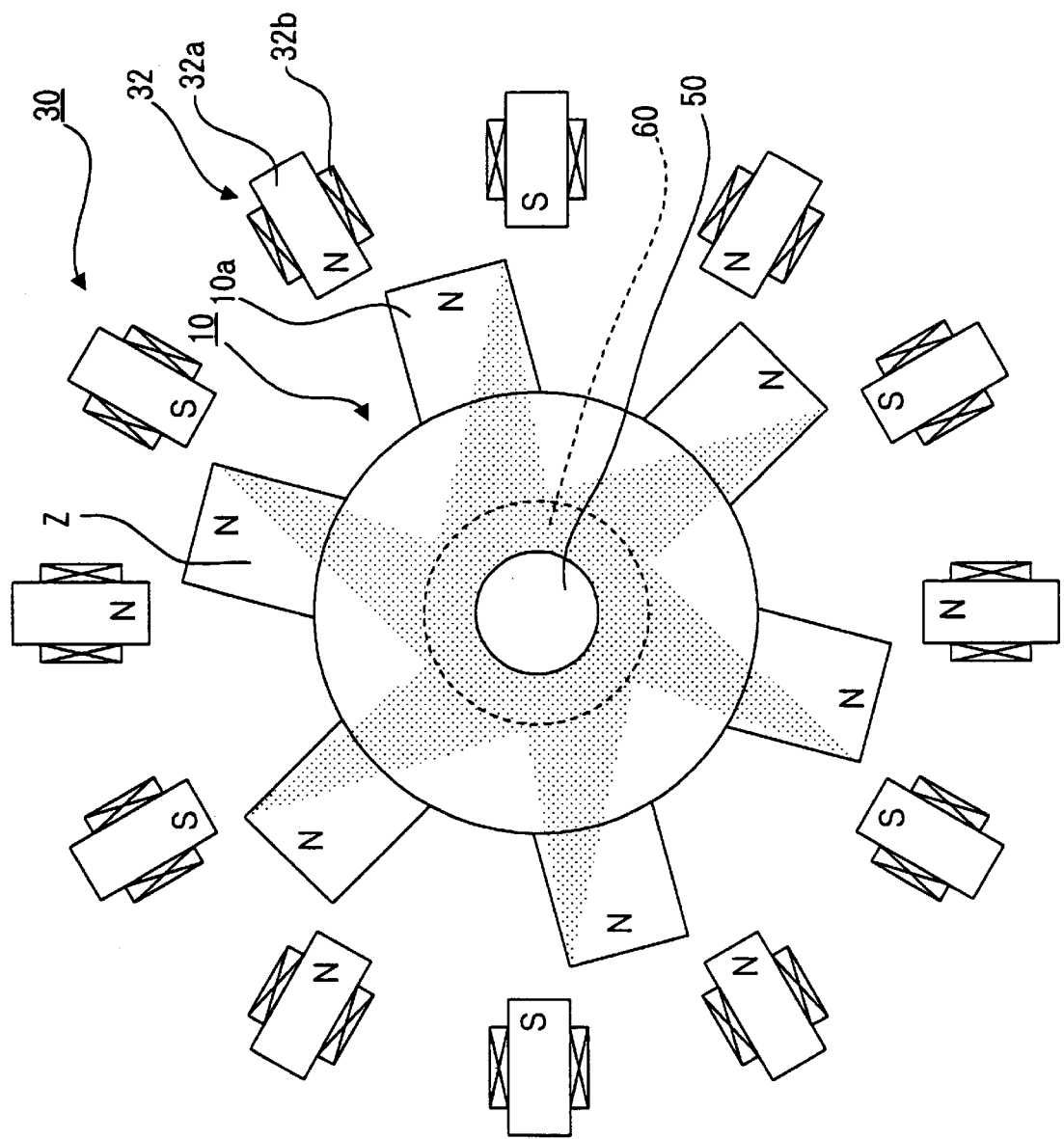

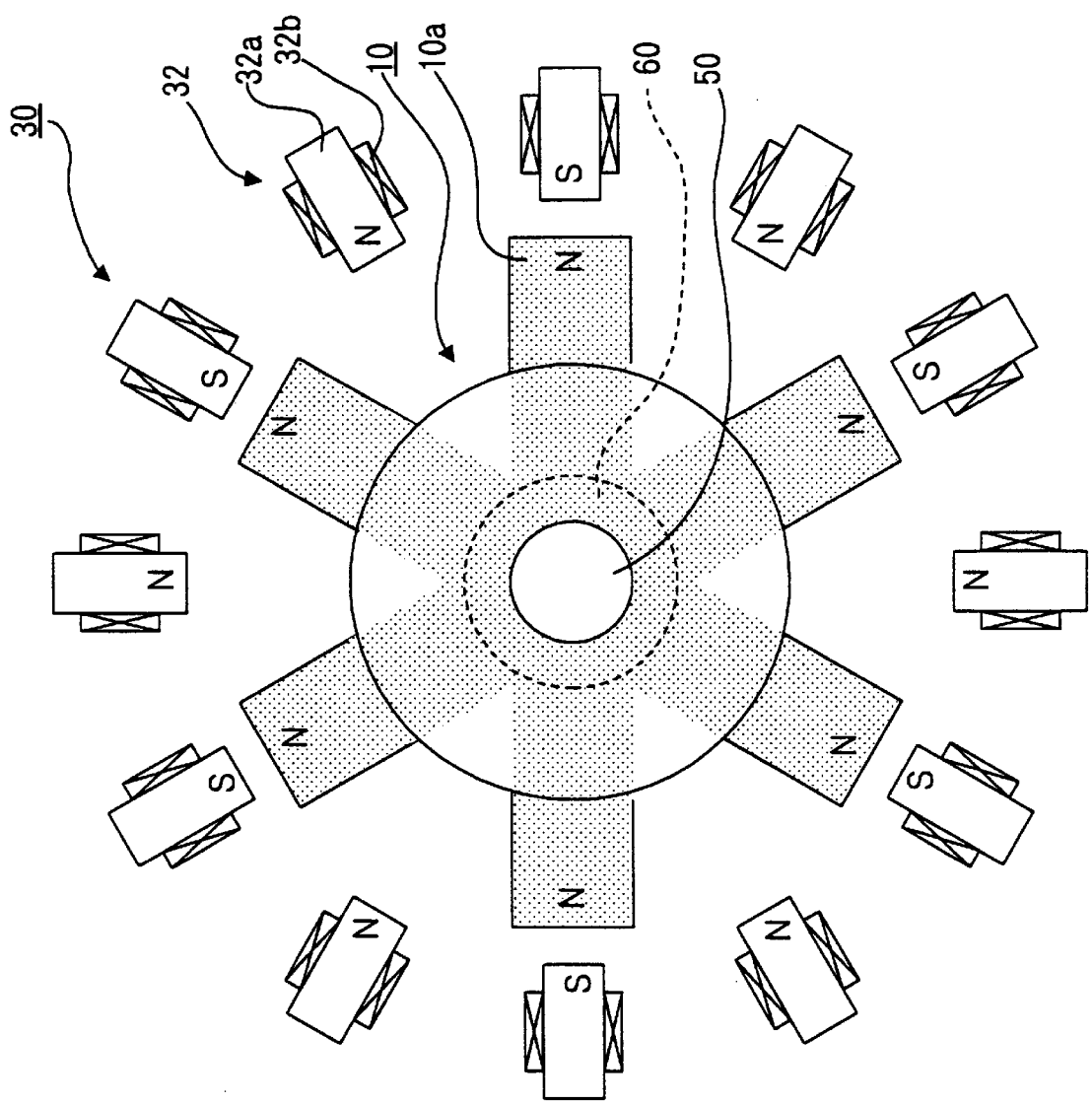

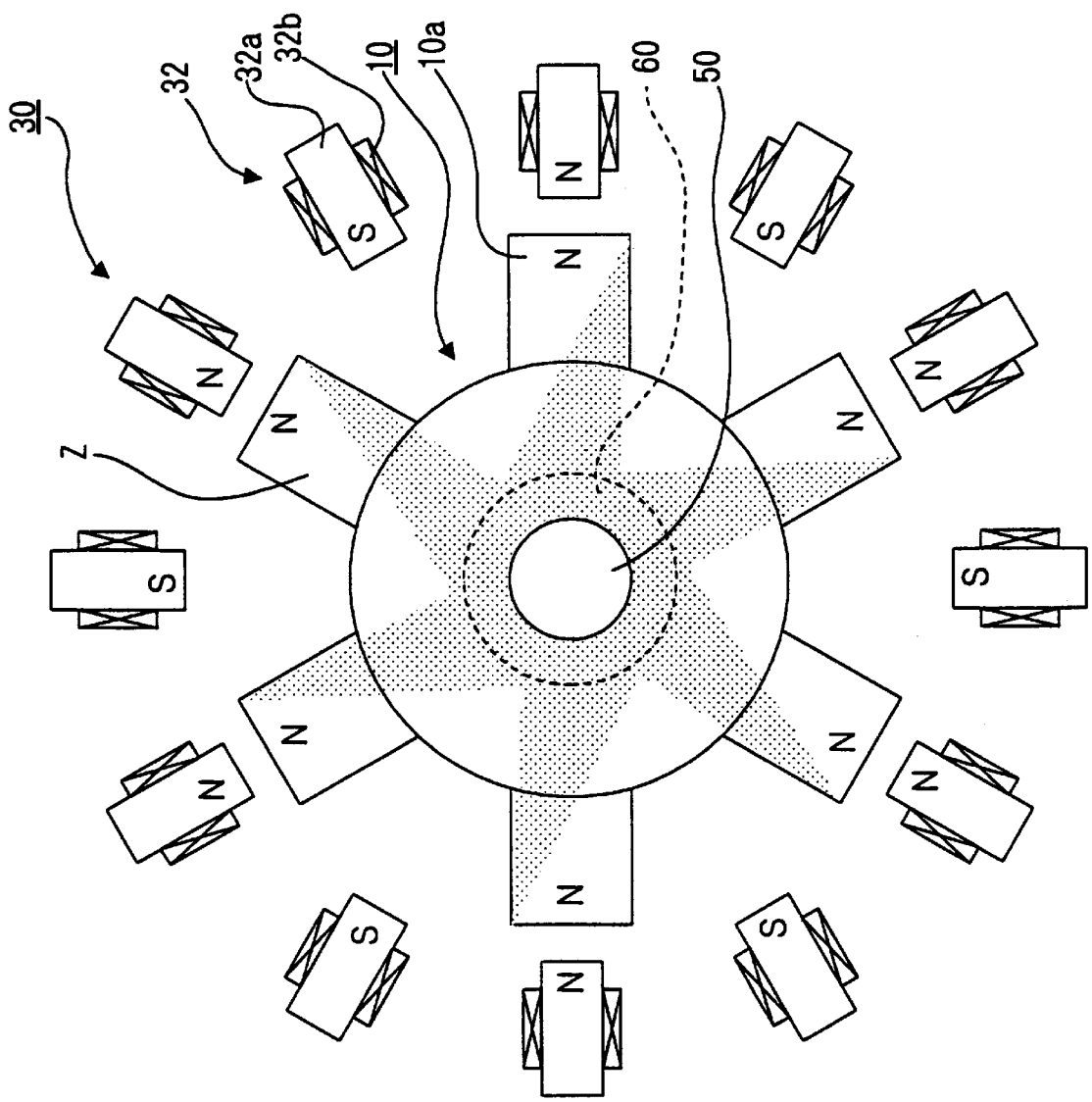

MOTIVE POWER GENERATING APPARATUS UTILIZING ENERGY OF PERMANENT MAGNET

BACKGROUND OF THE INVENTION

1. Field of the Invention

The present invention relates to a motive power generating apparatus utilizing magnetic energy of permanent magnet, specifically to a motive power generating apparatus providing higher energy conversion efficiency than those of the conventional electric motors.

2. Description of the Related Art

Various types of electric motors have been conventionally developed, which are designed to convert electric energy into mechanical force such as torque. What is common among those general electric motors is that electromagnets are employed as either stators or rotors, to which electric current is supplied from an external system. For example, in a typical induction motor configuration, a rotating magnetic field is generated by sequential change of a current supply to a plurality of electromagnets disposed in the stator and a rotor of a shape such as a squirrel cage follows the rotating magnetic field to produce an output torque. A typical dc motor includes a rotor rotatably arranged in a magnetic field of permanent magnets as a stator. The rotor is designed so as to change its polarity to produce torque by magnetic force between magnetic fluxes of the rotor and the stator.

Various attempts have been made in improving an efficiency of such conventional electric motors by utilizing magnetic flux from a permanent magnet. The present inventor has specifically focused on appropriate control of magnetic flux from a permanent magnet. Through experiments by experimental motors of various types using such appropriate control of magnetic flux distribution, the present inventor has confirmed that the control of magnetic flux distribution can successfully reduce magnetic force applied to the rotor, which prevents the rotor from rotating, and improves efficiency in converting electromagnetic energy to kinetic energy. Among the experimental power generating apparatuses is a motive power generating apparatus disclosed in Japanese Laid-open Patent Publication No. 7-7907 filed by the present inventor. The apparatus includes a rotor having a permanent magnet to improve conversion efficiency.

Recently, it has gradually become obscure if resources of energy such as fossil energy will be supplied constantly in future. At the same time, environmental problems such as an air pollution and a greenhouse effect emerge as an urgent agenda. Due to those conditions, it is strongly demanded to develop a motive power generating apparatus which enables conversion of electric energy into kinetic energy as efficiently as possible.

SUMMARY OF THE INVENTION

An object of the present invention is to provide a motive power generating apparatus providing higher efficiency and torque utilizing a magnetic field of a permanent magnet.

To accomplish these and other objects of the invention, according to one aspect of the present invention, a motive power generating apparatus comprises at least a pair of rotors arranged on a rotational shaft, a plurality of sets of electromagnets disposed annularly around the outer peripheral portion of each of the rotor, at least one magnetizing member disposed adjacent the respective rotors for magnetizing each of the rotor in an opposite polarity to each other, and a means for energizing the electromagnets in a predetermined sequence and timing. Each rotor has a plurality of protruding poles disposed at equal intervals along the outer peripheral portion thereof. At least some of the electromagnets are arranged corresponding to the protruding poles of each rotor, so that the protruding poles of each rotor are able to be attracted magnetically by the electromagnets energized in an opposite polarity to that of the protruding poles. The sets of electromagnets are magnetically isolated from each other.

The magnetizing member may comprise a permanent magnet having opposite polarities at the respective longitudinal ends.

Each rotor may comprise a disc-shaped member of magnetic material, which has a plurality of protruding portions disposed around the outer peripheral portion thereof at equal intervals. Each disc-shaped member of the rotor may further comprise a plurality of discs of magnetic material.

The motive power generating apparatus according the above aspect of the present invention may further comprise a plurality of stators disposed around the respective rotors. Each stator may has a ring-shaped member with a plurality of inwardly protruding portions disposed along the inner periphery thereof at equal intervals. Each protruding portion provided with a winding forms the electromagnet.

The energizing means may comprise a current switching circuitry, which supplies electric current to the electromagnets so that the adjacent electromagnets are magnetized in opposite polarities.

The polarity of each electromagnet may be reversed as the rotor is rotated by every pitch angle of the electromagnets.

According to another aspect of the present invention, a motive power generating apparatus comprises a pair of rotors fixed to a rotational shaft a predetermined distance apart from each other, two sets of electromagnets disposed around the respective rotors, a permanent magnet disposed between the rotors for magnetizing each rotor in an opposite polarity to each other, and a current switching circuitry for supplying energizing current to the electromagnets. Each rotor has a plurality of protruding poles disposed at equal intervals along the outer peripheral portion thereof. Each set of electromagnets includes a plurality of electromagnets disposed annularly around the outer peripheral portion of each rotor. At least some of the electromagnets are arranged as opposed to the protruding poles of each rotor. The sets of the electromagnets are magnetically isolated from each other. Every other electromagnet in each set magnetically attracts the adjacent protruding pole of the rotor, which is magnetized in an opposite polarity.

In the motive power generating apparatus according to the present invention, the magnetic flux from the energized electromagnet and the magnetizing member or the permanent magnet can be easily converged to the adjacent protruding pole of the opposite polarity since the magnetic flux from the electromagnets in one set are held open to those from the electromagnets in the other sets. Accordingly, energy loss due to confinement of the magnetic flux from the electromagnets in closed magnetic circuits between the sets of electromagnets are significantly reduced.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWING

FIG. 1 is a schematic plan view of a motive power generating apparatus according to one embodiment of the present invention;

FIG. 2 is a longitudinal sectional view of the motive power generating apparatus of FIG. 1; and FIGS. 3 to 6 are schematic plan views of a motive power generating apparatus shown in FIG. 1 as rotated clockwise.

DESCRIPTION OF PREFERRED EMBODIMENTS

As shown in FIGS. 1 and 2, a motive power generating apparatus according to one embodiment of the present invention includes rotors 10, 20, stators 30, 40, a rotational shaft 50, a permanent magnet 60, and a current controller 80. Each of the rotor 10, 20 is a disc-shaped member formed of magnetic material having six protruding poles 10a, 20a, respectively. The protruding poles 10a, 20a are arranged along the outer peripheral portion of the rotors 10, 20 at intervals of sixty degrees. In the present embodiment, each of the rotors 10, 20 includes laminated steel plates of the same size so as to reduce eddy current loss in the rotors 10, 20 during operation. The rotors 10 and 20 are fixed to the rotational shaft 50 a predetermined distance apart. The rotational shaft 50 is supported rotatably by a pair of bearings 70, 70 mounted in a frame F of the apparatus. In FIG. 2, the frame F is shown partially for avoiding awkwardness in the figure.

Between the rotors 10 and 20 is disposed a permanent magnet 60. The permanent magnet 60 is formed in a hollow cylindrical shape, which is fit around the outer surface of the rotational shaft 50 between the rotors 10 and 20. The permanent magnet 60 is a magnetizing member having an S pole and an N pole at the axial or longitudinal end portions thereof for magnetizing the rotors 10, 20 in opposite polarities respectively, disposed adjacent the axial end portions of the permanent magnet 60. In the present embodiment, the rotors 10 and 20 are magnetized in an N pole and an S pole, respectively.

Stators 30 and 40 are disposed around the outer periphery of the rotors 10 and 20, respectively. Each of the stators 30, 40 includes twelve electromagnets annularly arranged at intervals of thirty degrees. Each of the electromagnets 32, 42 has an armature 32a, 42a of ferromagnetic material and a winding 32b, 42b wound therearound. The windings 32b and 42b are supplied with electric current by the current controller 80. In the present embodiment, as illustrated in FIG. 1, the electromagnets 32 and 42 are separately disposed from each other. However, such a variation of the stator 30 or 40 is possible, in which a ring-shaped yoke with twelve protruding armature portions disposed along the inner circumferential periphery of the yoke, each of the armature portions provided with a surrounding winding.

The stators 30 and 40 are positioned spaced apart each other in an axial direction of the rotational shaft 50 corresponding to the rotors 10 and 20, respectively. Magnetic circuits of the stators 30 and 40 are isolated each other. This configuration is required to prevent loss of magnetic flux of the electromagnets 32, 42 where a closed magnetic circuit is established between the stators 30 and 40, since a part of the magnetic flux is captured in the closed magnetic circuit, thus such captured flux does not contribute to drive the rotors 10 and 20 any further.

The current controller 80, a means for controlling excitation current to the electromagnets 32, 42, is substantially a current switching apparatus for adjusting directions of the excitation current. Timing of altering the current direction is also controlled by the current controller 80. The controller 80 generally includes current switching devices such as transistors and thyristors, and a control circuitry for turning on and off of the switching devices. In the vicinity of the protruding poles 10a of the rotor 10 is disposed a rotation detector 90 for detecting a rotational angle of the rotor 10. In this embodiment, the rotation detector 90 comprises a photoelectric sensor and a rotational plate (not shown) having a plurality of notches, each having a predetermined shape for providing periodical light signals with the photoelectric sensor. The output signal of the rotational sensor 90 is input to the control circuitry of the current controller 80 as trigger signals for regulating turning on and off of the switching devices according to rotation of the rotor 10. The rotational sensor 90 may be selected among other types of sensors such as a proximity sensor or a rotary encoder.

Referring to FIGS. 1 and 3 to 6, operation of the motive power generating apparatus according to the present embodiment will be described hereinafter. FIG. 1 shows a condition of power off, in which neither of the electromagnets 32 is supplied with electric current, thus any of the electromagnets 32 is not energized. In this power off situation, the magnetic flux from the N pole of the permanent magnet 60 attached to the rotor 10 is distributed in a substantially entire area of the rotor 10. It should be noted that the operation to be mentioned below is applicable to the other rotor 20 by replacing N poles with S poles. In FIGS. 1 and 3 to 6, areas of "fine dots" illustratively show distribution of magnetic flux in the rotor 10 to be taken as an illustration. It should be noted that the above dotted areas in the figures merely illustrate a typical distribution of the magnetic flux in the rotor 10, 20.

FIG. 3 shows the rotor 10 and the stator 30 where the protruding poles 10a of the rotor 10 are substantially opposed to the electromagnets 32, respectively. The apparatus of this embodiment includes the rotor 10 having six protruding poles 10a and the stator 30 having twelve electromagnets 32. The protruding poles 10a and the electromagnets 32 are positioned at equal intervals, respectively. Therefore, as shown in FIG. 3, every other electromagnet 32 is substantially opposed to the protruding poles 10a.

The electromagnets 32 of the stator 30 facing the protruding poles 10a are magnetized in N poles, the same polarity as those of the facing protruding poles 10a. The electromagnets 32 positioned between the protruding poles 10a are magnetized in S poles, the opposite polarity to the above. In this situation, the rotor 10 is in an extremely unstable condition since the repelling magnetic force is caused between the protruding poles 10a and the electromagnets 32 opposing to each other, both of which are magnetized in the same polarity. In the situation shown in FIG. 3, each protruding pole 10a starts to rotate clockwise by an attractive magnetic force from the electromagnet 32 of the opposite polarity situated in a clockwise direction since the center portion C of each protruding pole 10a opposing to the electromagnet 32 is slightly deflected clockwise.

During rotation of the rotor 10 in a clockwise direction, the magnetic flux from the N pole of the permanent magnet 60 is converged to the electromagnets 32 of the opposite polarity as shown by a doted area in FIG. 3, which was distributed in the entire rotor 10 when the electromagnets 32 were not energized in FIG. 1. In the meantime, as shown in FIG. 3, such area Z is generated behind each of the converged magnetic fluxes in a rotational direction of the rotor 10, in which magnetic flux is sparsely distributed. In this specification, such areas in the rotor 10 are referred to as a "sparse flux area".

FIG. 4 shows a condition that the rotor 10 was rotated by approximately fifteen degrees clockwise from the previous state in FIG. 3. Each of the protruding poles 10a of the rotor 10 is positioned at the middle portion of the electromagnets 32, and successively rotated clockwise by attracting magnetic force from the forward electromagnet 32 of the opposite polarity in a clockwise direction. In this instance, the sparse flux areas Z exist behind the converged magnetic flux between the protruding poles 10a and the forward electromagnets 32, respectively, as described above. The sparse magnetic flux in each of the protruding poles 10a is repelled by the backward electromagnet 32 of the same polarity as that of the protruding poles 10a. This repelling magnetic force between the protruding pole 10a and the electromagnet 32 is relatively smaller than the aforementioned attractive magnetic force. However, the repelling magnetic force urges the protruding poles 10a of the rotor 10 in a clockwise direction to assist the rotor 10 to continue a clockwise rotation thereof.

FIG. 5 shows a condition that the rotor 10 is further rotated by approximately fifteen degrees from the previous position in FIG. 4. Each of the protruding poles 10a of the rotor 10 is opposed to the electromagnet 32 of the opposite polarity. Consequently, the attractive magnetic force between the protruding pole 10a and the electromagnet 32 of the opposite polarity to that of the opposing protruding pole 10a, operates in a radial direction of the rotor 10, thus does not contribute to the rotation of the rotor 10 any further.

FIG. 6 shows a condition in which a polarity of each of the electromagnets 32 is reversed in FIG. 5. The polarity of the electromagnet 32 is reversed by changing a direction of a current supplied to each windings 32b of the electromagnet 32. This condition is equivalent to the situation that the rotor 10 is rotated by thirty degrees clockwise in FIG. 3. In FIG. 6, the rotor 10 continues to rotate in a clockwise direction by an attractive magnetic force between the protruding poles 10a and the forward electromagnets 32 of the same polarity as that of the protruding poles 10a. It should be noted that an excitation current to the electromagnets 32 must be reversed dependant on number of poles n of the stator 30, i.e., number of the electromagnets 32. More specifically, a polarity of the electromagnets 32 must be reversed at every rotation by $(2\pi/n)$ radian. In the present embodiment, a polarity of the electromagnets 32 is reversed at every rotation of thirty degrees since the stator 30 has twelve electromagnets 32 according to the requirement described above.

A direction of an excitation current is changed to reverse a polarity of the electromagnets 32 when the protruding pole 10a is aligned against the electromagnet 32 of the opposite polarity of that of the protruding pole 10a. However, a timing for changing the current direction may be determined more strictly based on various methods. Among those methods is a finite element method, i.e., FEM, for sequentially analyzing distribution of a magnetic flux in the rotor 10, 20 as the protruding pole 10a, 20a is approaching to the electromagnet 32, 42 of the opposite polarity in the proximity thereof. These methods for analyzing distribution of magnetic flux in the rotor enables not only increase in output torque and improvement in efficiency of energy conversion but also finding an optimal timing for changing the direction of the excitation current to the electromagnets 32. The optimal timing of changing the current direction may be determined considering suppression of fluctuation in an output torque and other factors. The rotational sensor 90 for detecting the rotational angle of the rotor 10 may be adjusted so that the rotational sensor 90 triggers the current controller 80 appropriately to provide the excitation current to the respective electromagnets 32, which satisfies the above optimal timing.

While the present invention has been discussed in terms of the preferred embodiments, the present invention should be implemented in various fashions with incorporating modifications of the disclosed embodiments in addition, omission or modification of the detailed construction, without departing from the principle of the invention. Therefore, the present invention should be understood to include all embodiments encompassed within the spirit of the invention set out in the appended claims.

What is claimed is:

1. A motive power generating apparatus comprising:

at least a pair of rotors arranged on a rotational shaft, each of which having a plurality of protruding poles disposed at equal intervals along the outer peripheral portion thereof;

a plurality of sets of electromagnets disposed annularly around the outer peripheral portion of each said rotor, at least some of said electromagnets in each set arranged corresponding to the protruding poles of each said rotor, each set of electromagnets being magnetically isolated;

at least one magnetizing member disposed adjacent said respective rotors for magnetizing each said rotor in an opposite polarity to each other; and means for energizing said electromagnets in a predetermined sequence and timing, so that at least some of said protruding poles of each said rotor are able to be attracted magnetically by said electromagnets which is energized in an opposite polarity to that of said protruding poles.

2. A motive power generating apparatus claimed in claim 1, wherein said magnetizing member comprises a permanent magnet having opposite polarities at the respective longitudinal ends.

3. A motive power generating apparatus claimed in claim 1, wherein each said rotor comprises a disc-shaped member of magnetic material, having a plurality of protruding portions disposed around the outer peripheral portion thereof at equal intervals.

4. A motive power generating apparatus claimed in claim 3, wherein each said disc-shaped member of the rotor comprises a plurality of discs of magnetic material.

5. A motive power generating apparatus claimed in claim 1, comprising a plurality of stators disposed around the respective rotors, each of which having a ring-shaped member with a plurality of inwardly protruding portions disposed along the inner periphery thereof at equal intervals, each said protruding portion provided with a winding to form said electromagnet.

6. A motive power generating apparatus claimed in claim 1, wherein said energizing means comprises a current switching circuitry, which supplies electric current to the electromagnets so that the adjacent electromagnets are magnetized in opposite polarities.

7. A motive power generating apparatus claimed in claim 1, wherein a polarity of each said electromagnet is reversed as said rotor is rotated by every pitch angle of the electromagnets.

8. A motive power generating apparatus comprising:

a pair of rotors fixed to a rotational shaft a predetermined distance apart from each other, each of which having a plurality of protruding poles disposed at equal intervals along the outer peripheral portion thereof;

a two sets of electromagnets disposed around the respective rotors, each set including a plurality of electromagnets disposed annularly around the outer peripheral portion of each said rotor, at least some of said electromagnets arranged as opposed to the protruding poles of each said rotor, each set of the electromagnets being magnetically isolated;

a permanent magnet disposed between said rotors for magnetizing each said rotor in an opposite polarity to each other; and a current switching circuitry for supplying energizing current to said electromagnets, so that every other electromagnet magnetically attracts the adjacent protruding pole of the rotor, which is magnetized in an opposite polarity.

* * * * *